Aug. 12, 1924.
E. NIST
1,505,059
LAWN OR HEDGE CUTTER
Filed Feb. 24, 1923
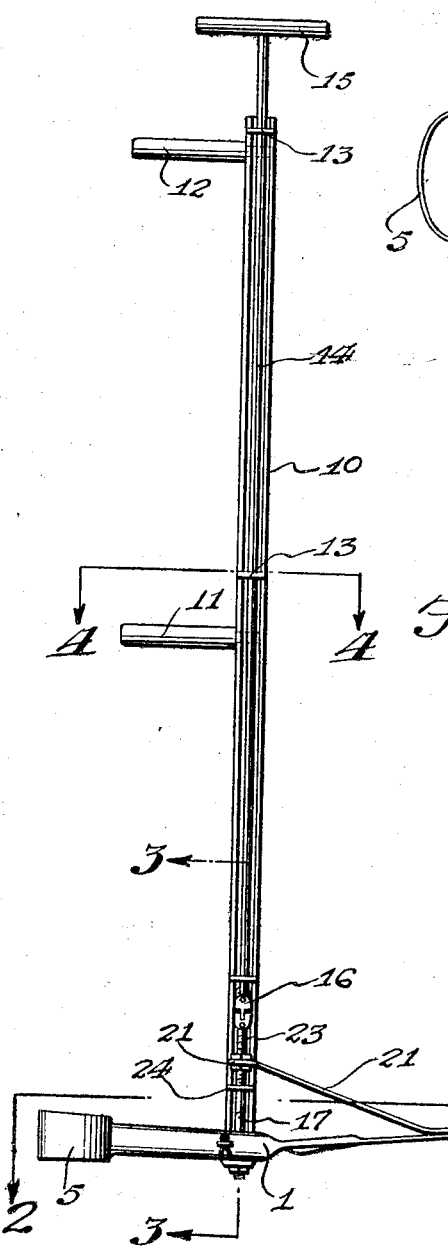
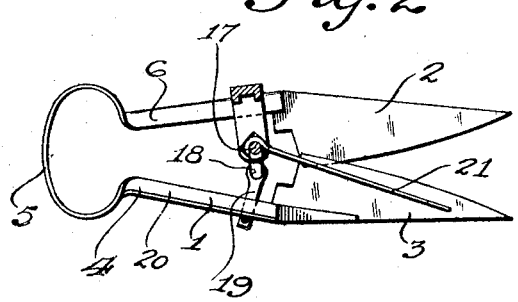
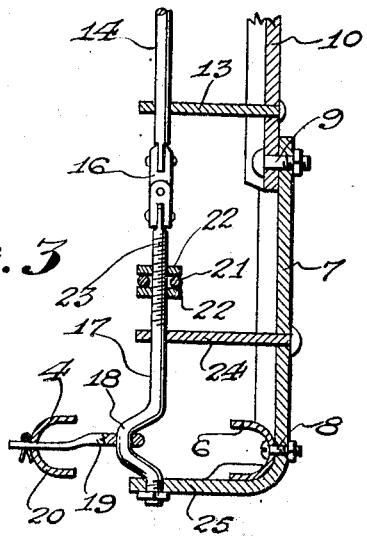
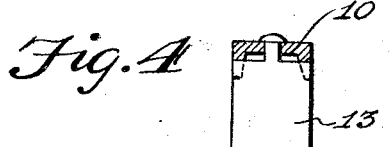
EDWARD NIST
INVENTOR
BY Victor J. Evans
ATTORNEY Patented Aug. 12, 1924.

1,505,059

UNITED STATES PATENT OFFICE.

EDWARD NIST, OF OAK PARK, ILLINOIS.

LAWN OR HEDGE CUTTER.

Application filed February 24, 1923. Serial No. 620,987.

*To all whom it may concern:*

Be it known that I, EDWARD NIST, a citizen of the United States, residing at Oak Park, in the county of Cook and State of Illinois, have invented new and useful Improvements in Lawn or Hedge Cutters, of which the following is a specification.

This invention relates to a lawn or hedge cutter, and an object of the invention is to provide a device by means of which the grass about flowers, shrubs along side walks or at other place inconvenient to access by a lawn mower may be cut without requiring the person cutting the same to kneel or stoop, thereby greatly relieving the operator of the fatigue usually accompanying such work, and also to provide a device which may be used for trimming hedges.

Another object of the invention is to provide a device as specified which embodies a universal joint structure in connection of the handle and cutter proper so as to permit the cutter to be positioned at acute angles relative to the handle when desired.

The present invention is an improvement over the lawn cutter disclosed in my application filed October 7, 1922, Serial No. 593,071.

Other objects of the invention will appear in the following detailed description taken in connection with the accompanying drawings wherein:—

Fig. 1 is a side elevation of the improved cutter.

Fig. 2 is a horizontal section on the line 2—2 of Fig. 1.

Fig. 3 is a detail vertical section on the line 3—3 of Fig. 1.

Fig. 4 is an enlarged cross section on the line 4—4 of Fig. 1.

Referring more particularly to the drawings, the improved lawn and hedge cutter comprises a pair of shears 1, which includes cutting blades 2 and 3 that are connected by a spring hand grip portion 4. The bowed spring end 5 of the handle portions is tensioned to urge the blades 2 and 3 apart as is ordinary in approved constructions of shears of this nature. The handle 6, has an angled supporting member 7 attached thereto by means of a bolt as shown at 8. The upper end of the upstanding member 7 is pivotally connected by means of a bolt 9 to the rigid supporting portion 10 of the handle structure.

The supporting portion 10 of the handle is slightly U shaped in cross section and it has hand grips 11 and 12 attached thereto, one at its upper end and the other intermediate its ends, as clearly shown in Fig. 1 of the drawings. The rigid handle portion 10 has laterally extending bearing plates 13 carried thereby which rotatably support an operating rod 14 on the upper end of which a handle 15 is mounted. The lower end of the operating rod 14 is connected by means of an universal joint 16 to a crank rod 17, to the crank 18 of which a pitman 19 is connected. The pitman 19 is in turn connected to a handle 20 of the hand grip portion 4, as clearly shown in Fig. 3 of the drawings so that when the rod 14 is rotated the plates 2 and 3 of the shears will be brought into cutting operation, and returned to open position alternately.

A brace rod 21 is connected to the blade 3 and to the crank rod 17. Adjustable connection is provided between the brace rod 21 and the crank rod 17 through the medium of the nuts 22 which are adjustably mounted upon the upper threaded portion 23 of the crank rod 17. A suitable bearing 24 is carried by the up-right 7 and rotatably supports the crank rod 17, while the lower end of the crank rod is rotatably carried by the lower horizontal end 25 of the up-right 7.

The universal joint 16 and pivotal connection 9 will permit the handle structure comprising the support 10 and operating rod 14 to be swung at various angles relative to the shears 1 for the purpose of cutting or trimming hedges or for reaching beneath various articles in the trimming of lawns or the like.

It is, of course, to be understood that the invention may be constructed in other manners and the parts associated in different relations and, therefore, I do not desire to be limited in any manner except as set forth in the claims hereunto appended.

Having thus described my invention what I claim is:

1. A lawn or hedge cutter comprising a pair of cutting blades, a spring for normally urging said blades apart, an up-right connected to one of said blades, a supporting handle pivotally connected to said up-right, an operating rod rotatably carried by said up-right, said up-right having its lower end bent transversely, a crank rod journaled in said transversely bent end, a universal joint connecting said crank rod and operating rod, and a pitman connecting the crank rod to the cutting blade other than the one to which said up-right is connected.

2. A lawn or hedge cutter comprising a pair of cutting blades, a spring for normally urging said blades apart, an up-right connected to one of said blades, a supporting handle pivotally connected to said up-right, an operating rod rotatably carried by said up-right, said up-right having its lower end bent transversely, a crank rod journaled in said transversely bent end, a universal joint connecting said crank rod and operating rod, and a pitman connecting the crank rod to the cutting blade other than the one to which said up-right is connected, and a brace rod adjustably carried by said crank rod and connected to said last named blade.

In testimony whereof I affix my signature.

EDWARD NIST.